J. H. SPERY.
DIPPING TANK FOR RADIATOR CORES.
APPLICATION FILED SEPT. 23, 1918.
1,292,909.
Patented Jan. 28, 1919.
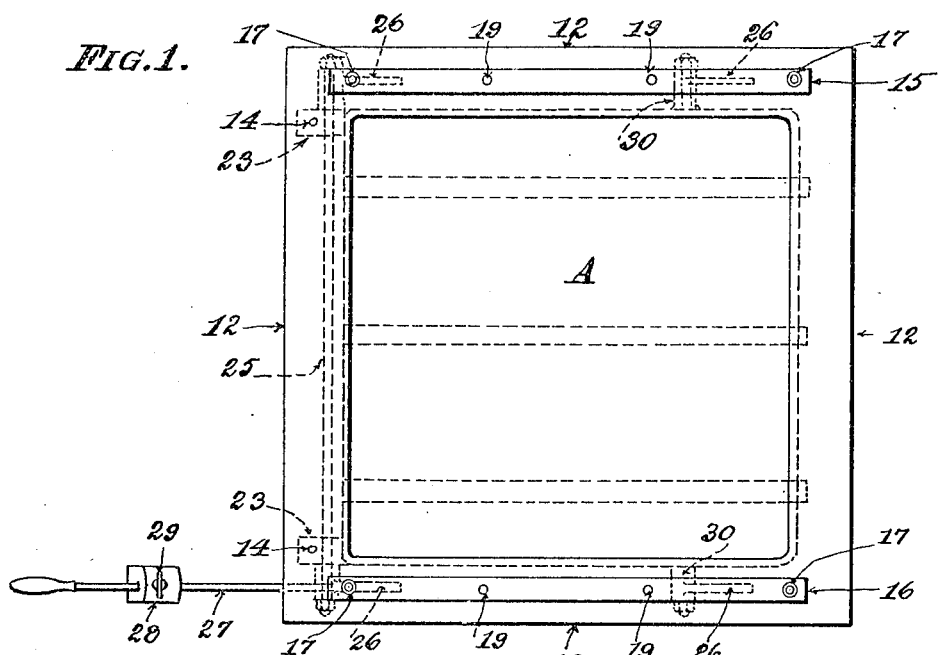
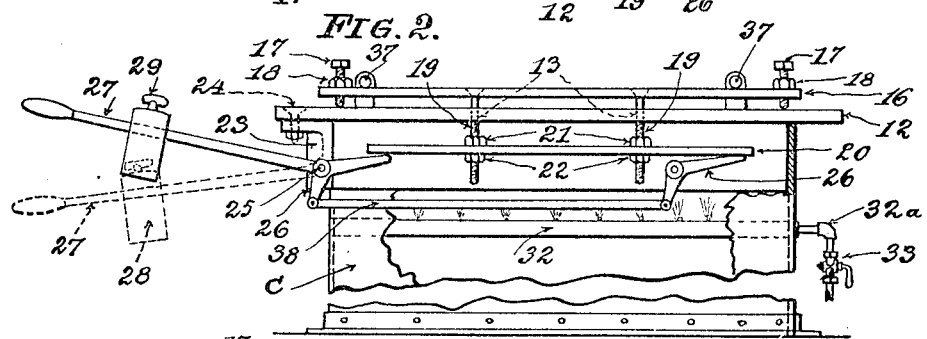
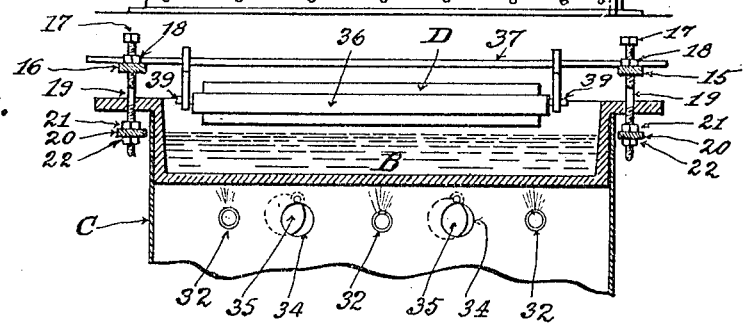
WITNESS:
INVENTOR:
JOSEPH H. SPERY,
BY Michael J. Stark & Sons
ATTORNEYS.

UNITED STATES PATENT OFFICE.

JOSEPH H. SPERY, OF CHICAGO, ILLINOIS.

DIPPING-TANK FOR RADIATOR-CORES.

1,292,909.   Specification of Letters Patent.   Patented Jan. 28, 1919.

Application filed September 23, 1918. Serial No. 255,269.

*To all whom it may concern:*

Be it known that I, JOSEPH H. SPERY, a citizen of the United States, and a resident of the city of Chicago, in the county of Cook and State of Illinois, have invented a certain new and useful Improvement in Dipping-Tanks for Radiator-Cores; and I do hereby declare that the following description of my said invention, taken in connection with the accompanying sheet of drawing, forms a full, clear, and exact specification, which will enable others skilled in the art to which it appertains to make and use the same.

My invention relates generally to improvements in dipping tanks for radiator cores; and it consists, essentially, in the novel and peculiar combination of parts and details of construction, as hereinafter first fully set forth and described and then pointed out in the claims.

The object of this invention is the production of an efficient, serviceable, and very economical apparatus for soldering the joints of radiator cores by dipping the cores with one flank in a bath of molten solder, and then reversing the core and dipping the other flank into the solder.

Radiator cores for the radiators of motor vehicles and the like, are built up of a multiplicity of sections or units, made of thin sheet metal, usually of brass or copper, which units after having been assembled, require soldering of the joints to make them water-tight. This soldering when done by hand with a so-called soldering iron, is a slow and very laborious and unreliable process; and to provide for means for soldering all of these joints at one flank of the core at one time, and in a very rapid manner, which is the object of my invention, I assemble the units of the radiator core in a metallic frame, similar to a printer's chase, which will not take solder, and then dip this core for a short time into molten solder, which at once solders all of the joints of the units in a perfect manner with the expenditure of but little solder. To prepare such a radiator core for soldering, it requires that the metal of the core be perfectly clean and free from oxid, and then, that it be dipped into a liquid bath of soldering flux, usually hydrochlorid of zinc, for a distance of approximately ¼ of an inch, and then, that it be dipped into molten solder for about the same distance. My invention provides for means whereby this dipping of the core is per-
formed with the greatest accuracy and to the proper depth and in a very satisfactory manner by unskilled help.

In the preferred embodiment of my invention, I construct this apparatus, as illustrated in the drawings, forming a part of this specification, and in which—

Figure 1 is a plan of the soldering tank; Fig. 2 is a side elevation of the same; and Fig. 3, a transverse sectional elevation, the levers employed in this device being omitted in this figure.

A in these drawings designates the tank. This tank is a cast-iron rectangular structure of proper width, length, and depth, to accommodate the largest radiator made, and to contain a sufficient amount of solder B, to prevent its being rapidly chilled when cores are dipped into this solder. This tank has laterally-extending flanges around its upper margins, by which it is supported upon a sheet-metal casing C, forming a pedestal for the tank. This flange is punctured at opposing sides of the tank with vertically disposed round holes 13 and at one end with bolt holes 14, the object of which will farther on appear.

Upon the two side flanges 12 of the tank, there are located flat bars of iron 15, 16, which bars have at their ends adjusting screws 17, provided with lock-nuts 18, to hold these adjusting screws in adjusted position. In these bars 15, 16, there are in each, two downwardly pending screw-threaded rods 19, suitably fastened to the bars 15, 16. These rods 19 are passed through the holes 13 in the flanges 12; and they are constructed to engage two bars 20, one at each side of the tank, a suitable distance below the flanges 12. These screw-rods 19 have adjusting nuts 21, 22, above and below the bars 20 to hold these bars adjustably to the screw-rods 19.

At one end of the tank there are secured bearings 23, fastened, preferably, to the flange by bolts 24, or any other means, and in these bearings there is rotatably mounted a shaft 25, having at its ends bell-crank levers 26, and also at one end a long arm 27, upon which there is movably secured a counterweight 28, which, by a set-screw 29, can be held in any desired position on said long arm. From opposing sides of the tank extend bosses 30; and in these bosses there are rotatably mounted bell-crank levers 26. One arm of a pair of these bell-crank levers 26, underlies the bar 20 at one side of the tank, and the opposing pair of bell-crank levers 26, underlie the other bar at the opposing side of the tank. Coacting pairs of these bell-crank levers are connected by bars or connecting rods 38, as illustrated in Fig. 2.

Underneath the tank within the pedestal there are a series of gas burners 32, fitted each with a supply pipe 32ª, and a stop-cock 33, by which the flow of gas to the burners may be perfectly adjusted. And in the walls of the pedestal there are air-admission openings 34, provided with shutters 35, to regulate the air-admission, in an obvious manner.

A radiator core D, Fig. 3, is clamped into a frame 36, constructed similar to a printer's chase; and this frame is suspended from two rods 37, which, when the core is ready for dipping, are placed upon the bars 15, 16 on the top of the tank. The long arm 27 is normally in the position shown in dotted lines in Fig. 2; and the bars 15, 16, in elevated position shown in Fig. 3. In this position the lower flank of the radiator core is in close proximity to the level of the molten solder. The counterweight on the long arm 27 is so adjusted that it sustains the radiator core with its clamping frame and the bars 15, 16, and 20, in elevated position by the arms on the bell-crank levers that underlie the bars 20. To dip the core into the molden solder, the long arm 27 is lifted to cause the core and its associated parts to descend; and this downward movement is regulated by the adjusting screws 17 in such a manner that when the flank of the core is immersed in the solder the proper depth, these adjusting screws bear upon the upper surfaces of the tank-flanges 12, and prevent further lowering of the core.

The level of the solder B in the tank is kept at practically constant height, by adding solder as often as required; and since radiator cores vary from 2 to 5 inches and must be accommodated in this dipping tank, the proper depth of immersion is regulated by the adjusting screws 17 in conjunction with the adjusting nuts 21, 22, on the screw-rods 19.

One flank of the radiator core having been dipped, the core is lifted off the bars 15, 16, by the rods 37, the frame 36 with its core rotated on its pivots 39, and then the other flank of the core is dipped precisely in the same manner as heretofore described. It requires but a few moments of immersion of the core in the molten solder to effect perfect sealing of the joints, and should testing of the radiator for watertightness show a leak anywhere, redipping of the core will always correct this fault, as well as leaks which might occur after the radiator has been placed into service.

I have hereinbefore described the preferred embodiment of my invention, but I desire it to be understood that minor details of construction might be varied, and parts omitted without departing from the scope of my invention as defined in the appended claims.

Having thus fully described this invention, I claim as new, and desire to secure to myself by Letters Patent of the United States—

1. An apparatus for soldering radiator cores, comprising a tank, said tank having at its margins laterally extending flanges, metallic bars upon said flanges on opposing sides, other metallic bars located below said flanges, said latter bars being adjustably connected to said first-mentioned bars, means for limiting the vertical movement of said bars, and means for lifting and lowering said bars.

2. An apparatus for soldering radiator cores, comprising a tank, said tank having at opposing margins laterally extending flanges, metallic bars upon said flanges in spaced relationship, other metallic bars located below said flanges, said latter bars being adjustably connected to the first-mentioned bars, means for lifting and lowering said bars, and adjusting screws in the first-named bars for limiting the downward movement of said lower bars.

3. An apparatus for soldering the cores of radiators, comprising a tank containing solder, means for heating this solder to fluidity, means for supporting a radiator core upon said tank with one of its flanks in close proximity of the level of said solder, means for allowing said supporting means to descend, means for limiting the downward movement of said supporting means, and means for lifting said supporting means.

4. An apparatus for soldering radiator cores, including a metallic tank constructed to contain solder, means for heating this solder to fluidity, said tank having at opposing sides laterally extending flanges, a bar on each of said laterally extending flanges, a further bar at each side of said tank below said flanges, rods connecting the top and bottom bars, a pair of bell-crank levers at opposing sides of said tank, each pair of coacting bell-crank levers being rod-connected, a shaft rotatably mounted on said tank, an operating bar on said shaft, a counterweight movably connected to said shaft, whereby said bars may be permitted to descend and be elevated by actuating said operating bar.

5. An apparatus for soldering the cores of radiators, including a tank constructed to contain solder, means for heating said solder to fluidity, said tank having at opposing sides laterally extending flanges, a bar on each of said flanges and spaced therefrom, adjusting screws on said bars for limiting their downward movement, a bar at each side of said tank below said flanges, the bars at each side of said tank being rod-connected, adjusting means on the said rods for adjusting the distance between the top and the bottom bar, and means for elevating and lowering said bars in unison.

6. An apparatus for soldering the cores of radiators, including a tank constructed to contain solder, means for heating this solder to fluidity, said tank having at opposing sides laterally-extending flanges, a bar on each of said flanges and spaced therefrom, adjusting screws in said bars for limiting their downward movement, a bar at each side of said tank below said flanges, the bars at each side of said tank being adjustably connected, journal bearings at one end of said tank, a shaft rotatably mounted in said bearings, a long arm mounted on said shaft, a counterweight adjustably mounted on said long arm, a pair of bell-crank levers fixed to said shaft, said bell-crank levers having each one arm underlying said lower bars at one end thereof, a second pair of bell-crank levers pivotally connected to the sides of said tank, the latter bell-crank levers having one arm underlying the bars below said flanges at their other ends, a connecting rod at each side of said tank operatively connecting coacting pairs of bell-crank levers, whereby said bars are permitted to descend, and may be lifted by the manipulation of said long arm, the core of a radiator being supported upon the bars above said flanges.

In testimony that I claim the foregoing as my invention I have hereunto set my hand.

JOSEPH H. SPERY.

Copies of this patent may be obtained for five cents each, by addressing the "Commissioner of Patents, Washington, D. C."